United States Patent [19]

Tanguy

[11] 4,131,125
[45] Dec. 26, 1978

[54] CHARGING VALVE FOR A FLUID PRESSURE ACCUMULATOR

[75] Inventor: Christian Tanguy, Frepillon, France

[73] Assignee: Societe Anonyme D.B.A., Paris, France

[21] Appl. No.: 802,218

[22] Filed: May 31, 1977

[51] Int. Cl.² ............................................ G05D 16/10
[52] U.S. Cl. ..................................... 137/118; 60/418
[58] Field of Search .......................... 60/418, 422, 426; 137/118

[56] References Cited

U.S. PATENT DOCUMENTS

| | | | |
|---|---|---|---|
| 2,779,346 | 1/1957 | Curlett | 60/418 X |
| 4,016,895 | 4/1977 | Budecker | 137/118 X |

Primary Examiner—Robert G. Nilson
Attorney, Agent, or Firm—Paul David Schoenle; Ken C. Decker

[57] ABSTRACT

An accumulator charging valve has a housing with an inlet and two outlet orifices respectively connected to the pump outlet, to a fluid accumulator and to an open center hydraulic circuit. A main passage is provided between the inlet orifice and the second outlet orifice, with a movable valve member mounted in the main passage, and operated by a differential piston having a face of smaller diameter exposed to the pressure prevailing at the inlet orifice and a face of larger diameter projecting into a control chamber, forming a resilient variable volume enclosure. A leakage passage is provided between the inlet orifice and a low pressure reservoir and has a first portion with an orifice of restricted cross-section situated between the inlet orifice and control chamber, and a second portion also with an orifice of restricted cross-section situated between the control chamber and the reservoir. The first portion comprises pilot means for permitting or interrupting the flow through the leakage passage as a function of the pressure level prevailing in the chamber of the accumulator.

8 Claims, 1 Drawing Figure

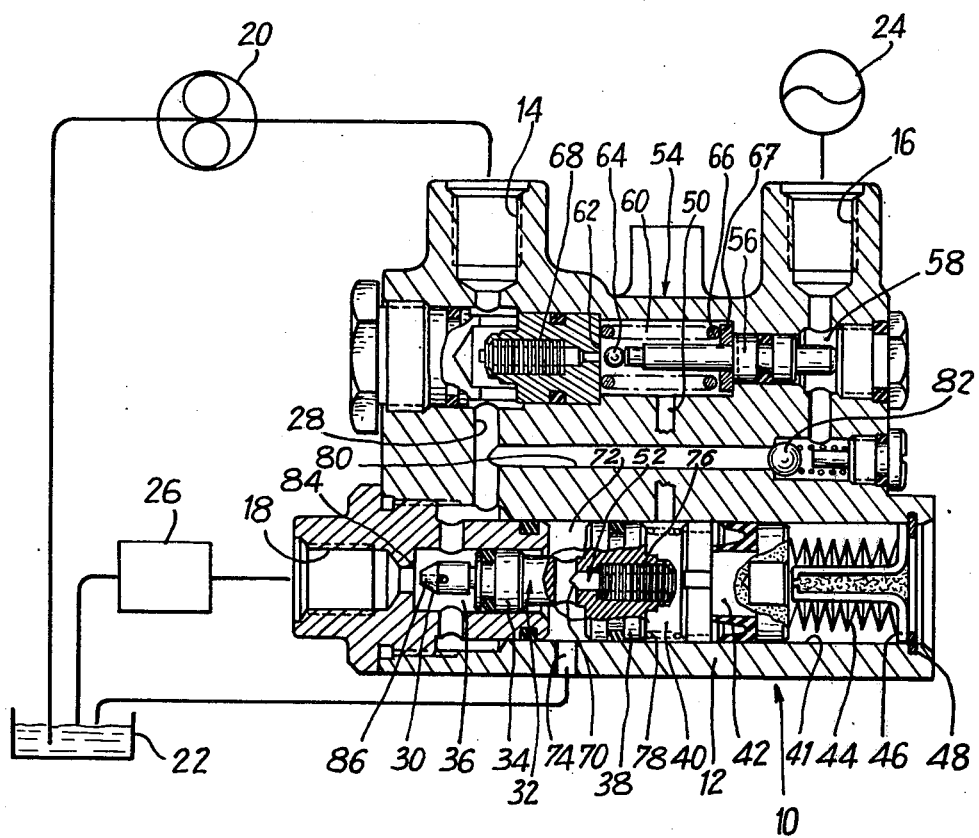

CHARGING VALVE FOR A FLUID PRESSURE ACCUMULATOR

The invention relates to a charging valve for a hydraulic accumulator, more particularly for charging a fluid pressure accumulator, from a hydraulic pump. These charging valves enable the accumulator to be charged when the pressure in the chamber in the latter falls below a first predetermined value, and they stop charging when the pressure reaches another predetermined value. One application of charging valves of this type is found in hydraulic circuits in motor vehicles in which a pump with a substantially constant flow rate, designed to operate an open-centre power steering valve, is associated with a brake-assisting circuit operated by an accumulator. The pumps are usually vane or gear pumps which, except during charging of the accumulator and operation of the power steering, deliver fluid at a low pressure of the order of 2 to 3 bars. While the accumulator is being charged, however, the pressure at the pump outlet is maintained at a level between 50 and 70 bars. At the beginning and end of the charging period, therefore, there are transitory phases during which the pressure at the pump outlet varies very abruptly, which much reduces the life of the pump. If the pump is of the gear or vane type, particularly, the supports for the gears or vanes tend to shift relative to one another as a result of this fluid hammering, which is too fast for the balancing means provided in the pump to be effective.

An object of the invention is to propose a charging valve which protects the pump satisfactorily and which can spread over a period the pressure variations found at the pump outlet under transitory conditions.

The invention consists of a charging valve comprising in a housing an inlet orifice connectible to the outlet of a hydraulic pump, a first outlet orifice connectible to the pressure chamber of a fluid accumulator and a second outlet orifice connectible to an open-centre hydraulic circuit, said charging valve also comprising a principal passage between the inlet orifice and the second outlet orifice, a principal movable valve member mounted in the passage and operated by a differential piston having a face of smaller diameter exposed to the pressure prevailing at the inlet orifice and a face of larger diameter projecting into a control chamber, a resilient variable-volume enclosure associated with the control chamber, a leakage passage between the inlet orifice and a low-pressure reservoir, the leakage passage having a first portion situated between the inlet orifice and control chamber and containing an orifice of restricted cross-section, and a second portion situated between the control chamber and reservoir and also containing an orifice of restricted cross-section, the first portion comprising pilot means for permitting or interrupting the flow-through the leakage passage as a function of the pressure level prevailing in the chamber of the accumulator.

In a preferred embodiment of the invention, the pilot means comprise a pilot spool separating two compartments in the housing, the first compartment being connectible to the pressure chamber of the accumulator, the second compartment communicating with the control chamber, and the pilot spool being associated with a pilot valve member mounted in the first portion of the leakage passage and resilient means urging the pilot valve member off its seat.

The invention will now be described with reference to the single FIGURE, representing a view in cross-section of a charging valve embodying the invention, associated by way of example only with a hydraulic circuit in a motor vehicle.

A charging valve 10 shown in the single FIGURE comprises a housing 12 with an inlet orifice 14, a first outlet orifice 16 and a second outlet orifice 18. The inlet orifice 14 is associated with the outlet of a hydraulic pump 20 of any known type, for example a gear pump, of which the inlet orifice is connected to a low-pressure fluid reservoir 22. The outlet orifice 16 is connected to the pressure chamber of an accumulator 24 intended, for example, to operate a closed-centre power-assisting circuit such as a hydraulic braking amplifier for a vehicle (not shown). The outlet orifice 18 is connected to a return circuit which feeds fluid back to the reservoir 22. In this application of the invention, given by way of example only, the fluid return circuit is used to operate an open-centre control device. This device is an open-centre power steering system 26 of any known type, of which the outlet is connected to the reservoir 22. Between the inlet orifice 14 and the outlet orifice 18 is defined a principal passage 28 containing a principal valve member 30. The valve member 30 is attached to a differential piston 32, of which the end 34 of smaller diameter projects into a cavity 36 directly connected to the inlet orifice by way of the passage 28, whereas the end 38 of larger diameter projects into a control chamber 40. The volume of the chamber 40 is variable owing to a resilient enclosure formed by a piston 42 slidable in the bore 41 in the housing 12 and resiliently loaded by a bank of cup springs 44 of the Belleville washer type mounted on a positioning stem 46, held in position in the housing by a circlip 48. As the FIGURE shows, the right-hand face of the piston 42 is connected to the atmosphere, packing being provided inside the stem 46 to prevent impurities from entering the bore 41.

The inlet orifice 14 is connected to the reservoir 22 by a leakage passage comprising a first portion 50, situated between the inlet orifice 14 and the chamber 40, and a second portion 52 situated between the chamber 40 and the reservoir 22. The flow through the leakage passage is controlled by pilot means 54 comprising a pilot spool 56 separating a first compartment 58 from a second compartment 60 freely communicating with the chamber 40, communication between said compartment 60 and the inlet orifice 14 being controlled by valve means comprising a valve seat 62 associated with a pilot valve member 64. The valve member is attached to the spool 56 and is normally, when the accumulator is discharged, held in the idle position illustrated — off its seat — by a spring 66 associated with a ring 67. Between the seat 62 and the inlet orifice 14 lies an orifice 68 of restricted cross-section, comprising a bank of spaced, perforated washers. The second portion 52 of the leakage passage is defined as follows: the face 38 of the piston 32 is provided with a passage 70 leading to a cavity 72 with a direct connection to the reservoir 22 through an orifice 74. The passage 70 also contains an orifice 76 of restricted cross-section, similar to the orifice 68. Lastly, between the two pistons 32 and 42, there is a weak spring 78 which ensures that the chamber 40 has a minimum volume. The inlet orifice 14 is connected by a duct 80 to the compartment 58, which in turn is connected to the orifice 16. The duct 80 contains a nonreturn valve 82 which enables the pressure chamber of the accumulator to be kept charged.

The valve member 30 can cooperate with a seat 84 bypassed by a passage of restricted cross-section designed to ensure that a small quantity of fluid flows from the pump to the power steering when the valve 30 is closed. In the embodiment described, the bypass passage is actually in the head of the valve member 30 (passage 86). The effective cross-section of this third passage of restricted cross-section, however, is greater than that of the two orifices 68, 76.

The charging valve just described operates as follows.

Assuming that the accumulator is charged to a pressure above its minimum level P1. The pilot valve member 64 is then urged into its closed position by the pressure prevailing in the compartment 58 and acting on the cross-section of the spool 56; the valve member 30 is clear of its seat 84 and is in the position illustrated. The pressure fluid therefore flows normally from the pump 20 to the power steering 26 which, if not operated, maintains a low pressure of the order of 3 bars at the inlet orifice 14.

When the pressure in the accumulator falls below its minimum pressure P1, for example 50 bars, the spring 66 urges the spool 56 and valve member 64 to the right in the FIGURE, opening the passage 50, 52 and allowing slight leakage from the pump 20 to the reservoir 22. Fluid flows through the restriction 68, compartment 60, control chamber 40 and restriction 76 to the reservoir. A low pressure is then generated in the compartment 60 and chamber 40, with the result, in the compartment 60, of keeping the valve member 64 open and, in the chamber 40, of pushing back the piston 42 despite the action of the cup springs 44 and moving the differential piston 32 so as to begin closing the principal valve member 30. As the valve member 30 begins to close, the flow between the pump 20 and power steering 26 is restricted, the delivery of the pump 20 remaining substantially constant, the pressure at the inlet orifice 14 will increase and so lead to an increase in the flow through the restrictions 68, 76. The restrictions 68, 76 are selected so that this increase in flow rate produces a pressure rise in the chamber 40. By way of example only, the pump may deliver 7 1/mn, each orifice 68 and 76 having an effective diameter of the order of 0.4 mm whereas that of the orifice 86 is of the order of 1 mm. The difference in the flow rates through the restriction 68 and the restriction 76 causes the piston 42 to move to the right, and this movement causes the integration in time of the difference in flow rate between the two restrictions, i.e. the increase in volume of the chamber 40, to correspond to a pressure proportional to the increase in the resistance offered by the cup springs 44. Moreover, the differential piston 32 is always balanced, under the influence of, on the one hand, the pressure prevailing in the chamber 36 and exerted on its face 34, and on the other the pressure prevailing in the chamber 40 and acting on its face 38. If K is the ratio between the areas of the two faces of the differential piston 32, the pressure in the cavity 36 will always substantially equal to K times the pressure in the control chamber 40, and it will therefore increase progressively as a function of time during the movement of the piston 42 to the right in the FIGURE. The accumulator then begins to recharge through the non-return valve 82 when the pressure at the inlet orifice 14 reaches its inflation level, very similar to the level P1. If the principal valve member 30 is closed, a minimum flow to the power steering 26 is ensured through the passage 86. When the pressure in the accumulator thus reaches the maximum pressure P2, of the order for example of 70 bars, the spool 56 is subjected on the one hand to the pressure P2 and on the other to the force exerted by the spring 66 plus the pressure which prevails in the compartment 60 and which is substantially 1/K times the pressure at the inlet orifice 14. The spool 56 then moves to the left in the FIGURE, enabling the valve member 64 to cooperate in a fluid-tight manner with its seat 62. The compartment 60 and chamber 40 are no longer supplied by the pump, and the pressure in them falls gradually as the fluid in the chamber 40 is progressively discharged to the restriction 76 under the influence of the piston 42 and cup springs 44. The pressure at the outlet of the pump decreases at the same time due to progressive opening of the valve member 30. Also, the pressure reduction in the compartment 60 keeps the valve member 64 closed. The various components of the charging valve thus return slowly to their idle positions, with the exception of the valve member 64 which remains closed.

It should be noted that the restrictions 68, 76 have small enough effective cross-sections for the flow rate through the leakage passage 50, 52 to remain low also. The appreciable saving in space obtained by using cup springs is further increased because the differential piston permits a substantial reduction in the maximum pressure in the chamber 40 relative to the maximum pressure at the inlet orifice (in the ratio K between the cross-sections of the faces of the differential piston) and consequently a reduction in the reaction force required of the resilient means of the resilient enclosure.

With a charging valve embodying the invention it is possible to have transitory operation of the order of a second, which is long enough for the balancing means in the pump to fulfil their function and to prevent seizure of the pump.

Within the scope of the invention, the compartment 58 may be connected directly to the pressure chamber of the accumulator, and not to the outlet orifice 16. Similarly, if the open-centre hydraulic circuit does not include a utilizing device, such as the power steering 26, the charging valve may be modified. In a variant of the invention (not shown) the passage 86 is eliminated, but there is a direct connection between the second outlet orifice 18 and the orifice 74.

I claim:

1. An accumulator charging valve comprising a housing having an inlet orifice connectible to the outlet of a hydraulic pump, a first outlet orifice connectible to the pressure chamber of a fluid accumulator, and a second outlet orifice connectible to an open-centre hydraulic circuit, said charging valve comprising a principal passage between the inlet orifice and the second outlet orifice, a principal movable valve mounted in the passage and operated by a differential piston having a face of diameter exposed to the pressure prevailing at the inlet orifice and a face of larger diameter projecting into a control chamber forming a resilient variable volume enclosure, a leakage passage between the inlet orifice and a low-pressure reservoir, the leakage passage having a first portion of restricted cross-section situated between the inlet orifice and the control chamber, and a second portion situated between the control chamber and reservoir and also containing an orifice of restricted cross-section, the first portion comprising pilot means for permitting or interrupting the flow through the leakage passage as a function of the pressure level prevailing in the chamber of the accumulator.

2. A charging valve as claimed in claim 1, wherein the pilot means comprise a pilot spool separating two compartments in the housing, the first compartment being connectible to the pressure chamber of the accumulator, the second compartment communicating with the control chamber, and the pilot spool being associated with a pilot valve member mounted in the first portion of the leakage passage and resilient means urging the pilot valve member off its seat.

3. A charging valve as claimed in claim 2, wherein the orifice of restricted cross-section in the first portion of the leakage passage is between the inlet orifice and the seat of the pilot valve member.

4. A charging valve as claimed in claim 1, wherein one end of the resilient enclosure is formed by a resiliently loaded piston.

5. A charging valve as claimed in claim 4, wherein the piston of the resilient enclosure is loaded by a bank of cup springs.

6. A charging valve as claimed in claim 2, wherein the first outlet orifice communicates with the first compartment which in turn communicates with the inlet orifice by way of a duct containing a non-return valve.

7. A charging valve as claimed in claim 1, wherein the orifices of restricted cross-section are formed by a bank of spaced perforated washers.

8. A charging valve as claimed in claim 1, wherein the principal valve member is bypassed by a third orifice of restricted cross-section of which the effective cross-section exceeds that of the first two orifices.

* * * * *